UNITED STATES PATENT OFFICE.

SOLOMON WEINBERG, OF PHILADELPHIA, PENNSYLVANIA, ASSIGNOR, BY MESNE ASSIGNMENTS, TO THE UNITED STATES WOOL COMPANY, OF DENVER, COLORADO, A CORPORATION OF ARIZONA.

PROCESS OF PRODUCING POTASSIUM FERROCYANIDE, POTASSIUM CYANIDE, POTASSIUM CARBONATE, AND RELATED PRODUCTS.

1,405,371.      Specification of Letters Patent.      Patented Jan. 31, 1922.

No Drawing. Application filed March 11, 1918, Serial No. 221,798. Renewed July 7, 1921. Serial No. 483,089.

*To all whom it may concern:*

Be it known that I, SOLOMON WEINBERG, a citizen of the United States, residing at Philadelphia, in the county of Philadelphia and State of Pennsylvania, have invented a certain new and useful Process for Producing Potassium Ferrocyanide, Potassium Cyanide, Potassium Carbonate, and Related Products, of which the following is a specification.

The invention contemplates the production of the stated products in an improved and economical manner and also contemplates an improved utilization of raw wool for the extraction from such material of valuable by-products among which the above-named materials are included.

The basis of the conception and development of the invention requires for its understanding a brief consideration of the ordinary commercial production of potassium ferro-cyanide and similar products, and also the ordinary commercial treatment of raw wool for obtaining from it its contained extraneous matters, comprising animal fats, suint, nitrogenous compounds, etc.

Potassium ferro-cyanide is ordinarily produced by combining potassium carbonate with nitrogenous organic matter, such as horn, hair, blood, leather scraps, etc., and iron fragments. The potassium carbonate is heated in a furnace and the other materials are added in suitable proportions and at suitable intervals, producing a violent reaction. The resulting material is cooled, broken up, digested with water, and the potassium ferro-cyanide developed in the reaction is thus extracted. This process is relatively too uncertain, expensive and inefficient, since the amount of organic matter to be added can never be accurately determined in advance; the quantities of materials added are therefore never exact and usually only a small part of the theoretically available product is obtained.

The entire amount of nitrogenous carbon compounds is, in this process, added in the form of horn, hair, etc., as above enumerated. While this provides theoretically all the necessary amounts of these ingredients, yet actually they are not combined in the organic matter added in such a way that they readily combine with the iron and the potassium carbonate. For this reason the reaction must be relatively long continued, the organic matter being added from time to time, and the violence of the process is such that a large part of the available elements is lost by volatilization. Usually analyses have to be made of the mixture at different periods of the reaction to determine what its condition is and, as nearly as possible, how much more organic matter should be added. The practical result of these difficulties is that the reaction as a rule cannot be continued long enough to get out any large proportion of the theoretically available potassium ferro-cyanide. 20% of the amount theroretically available from the base materials may be taken as a liberal average.

Raw wool has usually been washed in a solution containing cleaning elements and the resulting fluid contains the nitrogenous carbon compounds and potassium salts removed from the wool. These materials, however, are much diluted by the relatively large amount of water required for washing, and further modified by the washing materials, as, for example, the stated materials are saponified by soaps and alkalies generally used for washing. It has been recognized that the material thus obtained from wool is theoretically available for the production of potassium ferro-cyanide, but the treatment of the product on a commercial basis for this purpose is interfered with by the stated conditions to such an extent that a successful commercial production of the stated materials from wool by-products has not to my knowledge been accomplished.

Following the conception that potassium ferro-cyanide and related substances might be produced from wool by-products on a commercial scale, I have by study and experiment demonstrated that this can be done with relatively low cost, yielding material of large value in relation to the amount of basic material treated and avoiding the difficulties involved in the ordinary production of potassium ferro-cyanide as above briefly described, and also avoiding difficulties encountered if it is attempted to deal with wool washings as also briefly described.

In carrying out my invention I clean raw wool by a dry process, for example, by treating it with pulverized, more or less dehydrated, calcium sulphate. When the dirty wool is properly manipulated in the presence of this material, substantially all of the extraneous material is discharged from the wool along with the cleaning medium, leaving the wool in exceptionally clean, dry and perfect condition for utilization in the arts.

The extracted material is a dry, finely divided mixture comprising the cleaning powder combined with nitrogenous carbon compounds and potassium salts of various forms in an extremely intimate combination of such character that the nitrogen and carbon are readily available to combine with the iron to be added. The material also contains other matters not directly useful in forming the products here in view. None of the valuable material has been lost by undue leaching or evaporation, and no substantial part of the valuable material is lost by the following recited steps of treatment, due to the fact that no excess amount of water is added at any time, and no drastic heating is required to drive off excess water, which would involve the loss of valuable materials by volatilization.

To the stated extracted material is added distilled water until the soluble parts of the mass are completely dissolved. The solution then contains all of the nitrogenous carbon and potassium compounds desired for the present purpose, the amount of water being only sufficient to maintain these in solution. Substantially all of the cleaning powder and other matter discharge from the wool, such as vegetable particles, etc., remain out of the solution and the solution is drawn off and treated by any suitable process of concentration until the material becomes a pasty mass. To insure the presence of an ample amount of nitrogen and carbon a certain amount of dried blood, leather clippings, &c., is then added, say, one-half, more or less, of the weight of the pasty material. While the nitrogen and carbon contained in this added organic matter is not in the best form for combination with the other elements present, as are the carbon and nitrogen contained in the matter extracted from the wool, yet sufficient of these elements is added to insure the complete reaction for the production of the intended amount of potassium ferro-cyanide. Finely divided iron is then added and the material is heated. This heating is preferably done in a reverberatory furnace so that the material is in direct contact with the flame and air is excluded. Then the material is allowed to cool, is chopped up into small masses and lixiviated with water, in which all of the potassium ferro-cyanide is soluble. This solution is then heated until it reaches the proper specific gravity and the potassium ferro-cyanide is then separated by filtration from the remainder of the material and crystallized.

It has been found that the best results are usually obtained when it is attempted to extract substantially 50% of the theoretically available potassium ferro-cyanide. The amount of iron added to the material is calculated on this basis and reasonable variations from the exact amount are immaterial, since this would result only in slightly increasing or decreasing the amount of potassium ferro-cyanide produced. The object of adding iron calculated to produce only substantially 50% of the available potassium ferro-cyanide is that the reaction of the iron with the other materials is a relatively slow one and at the temperatures involved, if the process is continued too long, the potassium ferro-cyanide already developed is volatilized and wasted, and also a certain part of the nitrogen is driven off in the form of ammonia. Up to substantially 50% of the available amount the reaction proceeds with sufficient speed to avoid substantially all loss of the potassium ferro-cyanide and nitrogen. To extract a larger amount of the available potassium ferro-cyanide the process is repeated in a second or even a third stage.

Going back to the preferred treatment in which substantially 50% of the available potassium ferro-cyanide was produced, the remaining material is a solid mass containing potassium carbonate, potassium cyanide, and potassium chloride, together with other unimportant materials. Of the stated materials the potassium carbonate and potassium cyanide are relatively more important. They are extracted in successive stages by suitable well known methods of solution and separation.

As an example of the commercial importance of the process, it may be stated that approximately $33\frac{1}{3}$% of the weight of the raw wool is obtained in the solution formed by adding water to the materials extracted from the wool by the dry treatment, and of this approximately one-half is pure potash salts; that is, about 320 lbs. to the ton of wool, of these available potassium salts, by the 50% method above described, approximately 200 lbs. more or less of potassium ferro-cyanide is produced, having a value at this time of approximately $286. A substantial amount of both potassium cyanide and potassium carbonate is also produced, bringing the total value of the products up to about $350.

As compared with the first described commercial method of producing potassium ferro-cyanide, it may be pointed out that by that method only about 20% of the theoretically available potassium ferro-cyanide is produced.

The process is for convenience recapitulated as follows, with a somewhat more detailed description of the nature of the materials produced in the successive steps:

First. Raw wool is treated with a pulverized dry cleaning agent, such as calcium sulphate, and the cleaning agent with its contained matters is discharged from the wool, producing:

A. A complex, pulverized, substantially dry, mixture containing cleaning powder which is practically insoluble in water, particles of vegetable matter, which are also insoluble, and various soluble nitrogen and potassium compounds more particularly described in paragraph B hereafter.

Second. Water is added to the material A sufficient to take in solution all the soluble parts of A.

Third. The solution is drawn off and concentrated, producing:

B. A pasty mass containing nitrogenous carbon and potassium salts. The contents of this mixture may be more particularly described as follows, omitting any minor substances that are not important for the present purpose:

$B^1$. Free carbonic acid.

$B^2$. Ammoniam carbonate formed by the decomposition of urea.

$B^3$. Potassium carbonate formed at the expense of certain secretions by a peculiar fermentation.

$B^4$. Volatile fatty acids, including acetic acid, propionic acid, butyric acid, valerianic acid, and caproic acid.

$B^5$. Higher fatty acids, such as oenanthic acid, caproic acid, oleic acid, stearic acid and some acids of wax, especially cerotic acid. These acids are contained as potassium salts and are formed by action of potassium carbonate on the acids.

$B^6$. Fats in the form of emulsions.

$B^7$. Phenol as phenol bisulphonate of potassium.

$B^8$. Ordinary lactic acid.

$B^9$. Benzoic acid formed by the decomposition of hippuric acid.

$B^{10}$. Oxalic acid.

$B^{11}$. Succinic acid.

$B^{12}$. Uric acid.

$B^{13}$. Amido acids, glycol, leucine, tyrosine.

$B^{14}$. Coloring matters analogous to those of urine.

Fourth. Organic nitrogen carbon compounds, such as dried blood, leather clippings, etc., equal to one-half, more or less (in a specific performance of the process) by weight of the amount of the pasty material, and finely divided iron calculated (in a specific performance of the process) to produce approximately 50% of the available potassium ferro-cyanide, are added to B.

Producing:

C. A mixture of B, organic matter and iron.

Fifth. The mixture C is heated, conveniently in a reverberatory furnace, and withdrawn at such time as volatile parts of the mixture commence to be lost in considerable amount. This produces:

D. A compound containing potassium ferro-cyanide, potassium carbonate, potassium cyanide, potassium chloride, and other compounds relatively unimportant.

Sixth. The material D is broken up and lixiviated with water, in which all of the potassium ferro-cyanide is soluble, and the solution is separated from the remaining solids by suitable means, producing:

E. A solution of potassium ferro-cyanide in water and

F. Residual solids, namely, potassium carbonate, potassium cyanide, potassium chloride, etc.

Seventh. The solution E is treated to drive off the water and produce potassium ferro-cyanide usually in solid crystalline form.

Eighth. The material F is treated by successive stages of solution and separation to separate out potassium carbonate, potassium cyanide, and potassium chloride, when that product is desired.

The addition of organic matter such as bone, leather, etc., is not strictly essential, and without this addition in step "Fourth" above, a great improvement over previous processes of producing the potassium ferro-cyanide is made; but a still greater advantage is gained when a certain amount of such organic matter is added, as above explained.

I claim:

1. The process of making ferro-cyanide of potassium consisting in extracting soluble potassium salts and nitrogenous carbon compounds from raw wool in a substantially dry condition, adding water sufficient to form a solution, concentrating the solution, adding comminuted iron, heating and subsequently extracting the potassium ferro-cyanide.

2. The process of making ferro-cyanide of potassium consisting in extracting potassium salts and nitrogenous carbon compounds from raw wool in a substantially dry condition, adding water to produce a solution containing various potassium salts and nitrogenous carbon compounds, concentrating the solution, adding comminuted iron, heating and removing the ferro-cyanide of potassium thus formed by suitable steps of solution and separation.

3. The process of making ferro-cyanide of potassium consisting in extracting potassium salts, and nitrogenous carbon compounds from raw wool in a substantially dry condition, adding water to produce a solution containing various potassium salts and nitrogenous carbon compounds, concentrating the solution, adding comminuted iron and organic matter, heating, and removing the ferro-cyanide of potassium thus formed by suitable steps of solution and separation.

4. The process of making ferro-cyanide of potassium consisting in extracting potassum salts and nitrogenous carbon compounds from raw wool in a substantially dry condition, adding water to produce a solution containing various potassium salts and nitrogenous carbon compounds concentrating the solution, adding comminuted iron and organic matter, heating, removing the ferro-cyanide of potassium, and extracting thereafter by suitable steps other potassium salts.

5. The process of extracting potassium compounds available in wool or similar animal fiber, consisting in treating the same with pulverized dry cleaning material, discharging the cleaning material with other extraneous matters from the wool, separating soluble potassium salts from this discharged cleaning material by solution, and extracting one or more of the potassium compounds from the solution.

6. The process of extracting potassium compounds available in wool or similar animal fibre consisting in treating the same with pulverized dry cleaning material, discharging the cleaning material along with other extraneous matter from the said organic matter, separating soluble potassium salts from this discharged cleaning material, extracting one or more potassium compounds from the solution by concentrating, adding comminuted iron thereto, heating, and extracting the potassium ferro-cyanide so produced from the remainder of the material.

SOLOMON WEINBERG.